(12) United States Patent
Zaib et al.

(10) Patent No.: US 9,970,413 B2
(45) Date of Patent: May 15, 2018

(54) WIND TURBINE WITH A LOAD CONTROLLER

(71) Applicant: VESTAS WIND SYSTEMS A/S, Aarhus N (DK)

(72) Inventors: Ali Zaib, Aalborg (DK); Kenneth Tougaard Simonsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 565 days.

(21) Appl. No.: 14/404,159

(22) PCT Filed: Jun. 6, 2013

(86) PCT No.: PCT/DK2013/050172
§ 371 (c)(1),
(2) Date: Nov. 26, 2014

(87) PCT Pub. No.: WO2013/182200
PCT Pub. Date: Dec. 12, 2013

(65) Prior Publication Data
US 2015/0132128 A1 May 14, 2015

Related U.S. Application Data

(60) Provisional application No. 61/656,664, filed on Jun. 7, 2012.

(30) Foreign Application Priority Data

Jun. 6, 2012 (DK) .................................. 2012 70300

(51) Int. Cl.
*F03D 7/02* (2006.01)
*F03D 7/04* (2006.01)
*G05B 13/02* (2006.01)

(52) U.S. Cl.
CPC ........... *F03D 7/0224* (2013.01); *F03D 7/024* (2013.01); *F03D 7/042* (2013.01); *F03D 7/043* (2013.01);
(Continued)

(58) Field of Classification Search
CPC ...... F03D 7/042; F03D 7/0296; F03D 7/0264; F05B 2270/807; F05B 2270/808; F05B 2270/821
See application file for complete search history.

(56) References Cited

U.S. PATENT DOCUMENTS

| | | | |
|---|---|---|---|
| 7,964,979 B2 * | 6/2011 | Miranda | F03D 7/0224 290/44 |
| 2006/0002792 A1 | 1/2006 | Moroz et al. | |

(Continued)

FOREIGN PATENT DOCUMENTS

| | | |
|---|---|---|
| DE | 19739162 A1 | 3/1999 |
| WO | 2010016764 A1 | 2/2010 |
| WO | 2012/044161 A2 | 4/2012 |

OTHER PUBLICATIONS

Selvam, K.: "Individual Pitch Control for Large Scale Wind Turbines", ECN-E-07-053, Jul. 25, 2007.
(Continued)

*Primary Examiner* — Logan Kraft
*Assistant Examiner* — Joshua R Beebe
(74) *Attorney, Agent, or Firm* — Patterson + Sheridan, LLP

(57) ABSTRACT

The invention provides a wind turbine, a control system for a wind turbine and a method for controlling a wind turbine where asymmetry in load on the rotor is compensated by individual pitching by comparing a load distribution over the rotor plane with a threshold value. To avoid unnecessary compensation, the threshold value is adjusted based on a (Continued)

loading of the wind turbine or based on climate conditions under which the turbine operates.

14 Claims, 3 Drawing Sheets

(52) U.S. Cl.
CPC .... *G05B 13/0205* (2013.01); *F05B 2260/966* (2013.01); *F05B 2270/331* (2013.01); *Y02E 10/723* (2013.01)

(56) References Cited

U.S. PATENT DOCUMENTS

| | | | | |
|---|---|---|---|---|
| 2007/0132247 | A1* | 6/2007 | Galayda | F01D 15/08 290/44 |
| 2009/0246019 | A1* | 10/2009 | Volanthen | F03D 17/00 416/1 |
| 2009/0266160 | A1* | 10/2009 | Jeffrey | F03D 13/35 73/455 |
| 2009/0317250 | A1* | 12/2009 | Gamble | F03D 1/0658 416/1 |
| 2010/0119370 | A1* | 5/2010 | Myhr | F03D 7/02 416/39 |
| 2011/0084485 | A1 | 4/2011 | Miranda et al. | |
| 2011/0144815 | A1 | 6/2011 | Neumann | |
| 2012/0027566 | A1 | 2/2012 | Boerlage et al. | |
| 2012/0055247 | A1* | 3/2012 | Gonzalez Castro | G01M 1/28 73/455 |
| 2012/0134813 | A1* | 5/2012 | Nies | F03D 7/022 416/1 |
| 2012/0183399 | A1* | 7/2012 | Perkinson | F03D 7/0224 416/1 |

OTHER PUBLICATIONS

International Search Report for PCT/DK2013/050172, dated Sep. 18, 2013.
Danish Search Report for PA 2012 70300, dated Jan. 18, 2013.

* cited by examiner

WIND TURBINE WITH A LOAD CONTROLLER

FIELD OF THE INVENTION

The invention relates to a method for controlling operation of a wind turbine and to a wind turbine comprising a rotor with at least one rotor blade.

BACKGROUND OF THE INVENTION

The use of wind turbines has become a common way of generating electricity and the size and performance of the turbines have increased.

The wind turbines typically include multiple blades which transform wind energy into rotational motion of a drive train to thereby produce electricity. Existing turbines are controlled by computerised controllers which can amend various settings to bring the turbine to an optimum with regards to power production, load on the blades and drive train and general wear on the turbine.

Often, the blades can rotate about their longitudinal axis and thereby convert a varying degree of the wind energy. This activity is referred to as "pitching", and in a traditional wind turbine, pitching is controlled such that the wind turbine utilise as much of the available wind energy until a rated power production is reached. If the wind turbine has reached the rated power production and the available wind energy increases further, the blades are pitched away from the optimal situation to maintain the rated power production. At a certain cut-out wind energy intensity, the blades are pitched to a position where transformation between wind energy and rotational motion is prevented. This is often referred to as "feathering". The rotation stops and the control system waits for a decrease in wind intensity before reinitiating production by pitching back the blades from the feathered position.

The loads on the wind turbine structure are highly dependent on the climate conditions in which the turbine operates and the size of the major components e.g. blades. Different control algorithms are deployed today on the wind turbines to reduce the loads based on climate conditions.

Asymmetrical loadings across the rotor are responsible for a significant contribution to fatigue loads. Asymmetrical loadings are caused e.g. by wind shear, and today wind turbine controllers are sometimes adapted to reduce or eliminate tilt and yaw moments on the wind turbine by controlling the pitch of each blade separately. This activity could be based on conditions, e.g. blade bending, experienced individually by each blade. Sometimes, this is referred to as Yaw and Tilt Control. In practise, the asymmetric loads are balanced by cyclic pitching of the blades based on estimated/calculated tilt and yaw moment on the rotor, and in the existing controllers, the loads are brought to a pre-defined, static, reference level also referred to as a threshold value. The static threshold value is typically defined during the design phase based on the structural limitations of the wind turbine, based on the risk of tower-blade collision etc.

US2011/0064573 discloses a method for controlling operation of a wind turbine where a set point limit is determined based on a measured atmospheric condition.

US2006002792 discloses a method for reducing load and providing yaw alignment in a wind turbine includes measuring displacements or moments resulting from asymmetric loads on the wind turbine. These measured displacements or moments are used to determine a pitch for each rotor blade to reduce or counter asymmetric rotor loading and a favourable yaw orientation to reduce pitch activity. Yaw alignment of the wind turbine is adjusted in accordance with the favourable yaw orientation and the pitch of each rotor blade is adjusted in accordance with the determined pitch to reduce or counter asymmetric rotor loading.

In an attempt to reduce asymmetric loading, the blades are sometimes pitched unfavourably with regards to conversion of wind energy to rotational movement, and the traditional Tilt and Yaw control therefore potentially reduces the power production of the turbine. Tilt and Yaw control by pitching also increases the wear on the pitching system and thereby increases the maintenance costs.

DESCRIPTION OF THE INVENTION

To reduce extreme loads e.g. on the main bearing which carries the rotor or rotor shaft, and to increase blade tower clearance of the turbine, or generally to enable a better load distribution without unnecessary power reduction, stopping of the wind turbine or increased maintenance costs, the present invention, in a first aspect, provides a wind turbine comprising a rotor with at least one rotor blade. The rotor is rotatable about a rotor axis and defines a rotor plane. The wind turbine further comprises a load control system adapted to determine a load distribution on the rotor plane and to determine a blade pitching value for each rotor blade individually to thereby compensate for asymmetry in the load distribution.

The load control system is adapted to carry out the compensation based on a difference between the determined load distribution and a threshold value, and the control system is adapted to determine the threshold value based on loading of the wind turbine and/or climate conditions.

This provides the ability to perform a more selective control activity and therefore to avoid unnecessary activities such as blade pitching by adapting the control activity to the climate condition.

The benefit of this would be reduced loads and increased blade tower clearances with minimum increase on the fatigue of the actuators which are required to perform the control action, i.e. e.g. pitching system and the associated hydraulic or electric actuators which constantly moves the blades back and forth about their longitudinal axes.

Since the threshold value is adjusted dynamically, the pitching of blades to counteract asymmetry may be reduced to a minimum, i.e. only to situations where the asymmetry plays an importantly negative role for the load on the turbine. Accordingly, unnecessary power production loss due to the pitching can be reduced.

It may, as an example, be decided not to compensate for asymmetric loadings when the most loaded blade is loaded less than a certain percentage of an average loading, or it may be decided not to compensate when the wind speed or wind turbulence is below a certain level.

According to the invention, the load controller can determine the threshold value based on loading of the wind turbine or based on measured climate conditions.

The load conditions could e.g. be determined by measuring blade bending, by measuring torque in the drive train, e.g. torque on the rotor shaft or in the transmission, it could be measured by measuring the performance such as the power generation of an electric generator in the wind turbine or it could be determined in any similar well known manner. The load could also refer to a rotor speed, a rotor acceleration etc.

The climate condition could be determined by an external sensor, or it could be received from other sources, e.g. as a signal received over the Internet, by wireless communication from a weather forecast provider or in any similar manner. The climate condition may relate to wind speed, turbulence, air density, temperature, or measure wind shear etc.

The threshold value could e.g. be determined based on a difference between a load on one of the blades and an average load on all of the blades, e.g. a load average over a pre specified duration, e.g. over 1-10 minutes.

The threshold value could also be determined based on an average wind speed, wind acceleration, or turbulence measured in a predetermined time period, e.g. 1-60 minutes.

Asymmetric loads on the blades may generally provide asymmetric forces on the rotor plane in a vertical plane and/or in a horizontal plane.

A negative lift, i.e. a downwards directed force on the rotor plane can be created by an asymmetric force in a vertical plane. To counteract such a negative lift, appropriate control activity may aerodynamically lift the rotor and thereby the ability to reduce the loads driven by the mass of the rotor. Herein, the wording "lift" does not necessarily specify movement of the rotor plane but rather that the rotor is subject to force acting with or against gravity on the rotor plane. Such forces are typically a result of an asymmetric forces in a vertical plane.

The threshold value may be determined such that the compensation creates a positive or negative lift of the rotor plane and thus counteracts asymmetric forces in a vertical plane. For this purpose, the load on the main bearing which carries the weight of the rotor shaft may be particularly relevant to observe, and the threshold value may be determined based on the loading of these bearings.

The threshold value may also be determined such that the load controller compensates for a yaw error or generally compensates for any asymmetric forces on the rotor in a horizontal plane. Such asymmetric forces typically create a torque about the vertical rotation axis, i.e. the yaw axis, about which the nacelle is rotatable relative to the tower.

To orient the drive train and rotor plane directly up against the wind, active yaw systems typically includes yaw motors which rotates the nacelle. It may be particularly relevant to observe loading on such motors, and to determine the threshold based on the loading of the yaw system.

One particular aspect in high wind operation is to ensure a safe distance between the tip of the blade and the tower. When the blade bends backwards towards the tower it comes closer to the tower, and it may be necessary to pitch the blade to release pressure on the blade as it passes the tower. According to the invention, the threshold value may be adjusted based on a tower clearance between a tower of the wind turbine and at least one of the rotor blades e.g. based on a measured maximum deflection or measured as a difference between an actually observed distance between the blade tip and the tower and a minimum safety distance.

The frequency (update frequency) by which the load control system updates the threshold value and/or by which the load control system compares the threshold value with the observed asymmetry, and/or by which the load control system updates the calculated asymmetry based on load sensing signals, should preferably be in the range of 0.5-5 times a frequency f, where f is determined as:

$$f = \frac{1}{t_p},$$

where $t_p$ is the time it takes for the blade tip to pass the tower.

Accordingly, the load control system may operate with the update frequency which depends on the rotor rotational speed and thus on the speed of the rotor blade tip when passing the tower.

Particularly, the update frequency may be in the range of 2-4 times the frequency f, such as about three times the frequency f.

In a second aspect, the invention provides a method for controlling a wind turbine as described above. According to this method, an asymmetric loading of the rotor is determined and compared with a threshold value, and the threshold value is determined based on loading of the wind turbine or a climate condition.

According to the method, at least one of the load distribution, the threshold value, and the compensation for asymmetry is determined with an update frequency which is determined based on a rotational speed of the rotor.

Particularly, the frequency may be between 2 and 4 times a frequency defined by the time it takes for a blade tip to pass a tower of the wind turbine, e.g. 3 times that frequency f described already relative to the first aspect of the invention.

In a third aspect, the invention provides a computer program product where the program is to make the computer execute a procedure including the steps of receiving an identifier which identifies a loading of a wind turbine or a climate condition, and determining a threshold value for an asymmetric loading of a rotor of the wind turbine based on the measurement.

In a fourth aspect, the invention provides a control system for a wind turbine comprising a rotor with at least one rotor blade, the rotor defining a rotor axis and a rotor plane. The control system is adapted to set a blade pitching value for each rotor blade individually to compensate for asymmetry in load on the rotor by comparing a load distribution over the rotor plane with a threshold value. The control system is adapted to adjust the threshold value based on an average loading of the wind turbine or climate conditions.

Any of the features described relative to the first aspect of the invention may apply equally to the second third and fourth aspects of the invention.

BRIEF DESCRIPTION OF THE DRAWINGS

The invention will now be described by way of an example with reference to the following figures in which.

DETAILED DESCRIPTION OF EMBODIMENTS

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
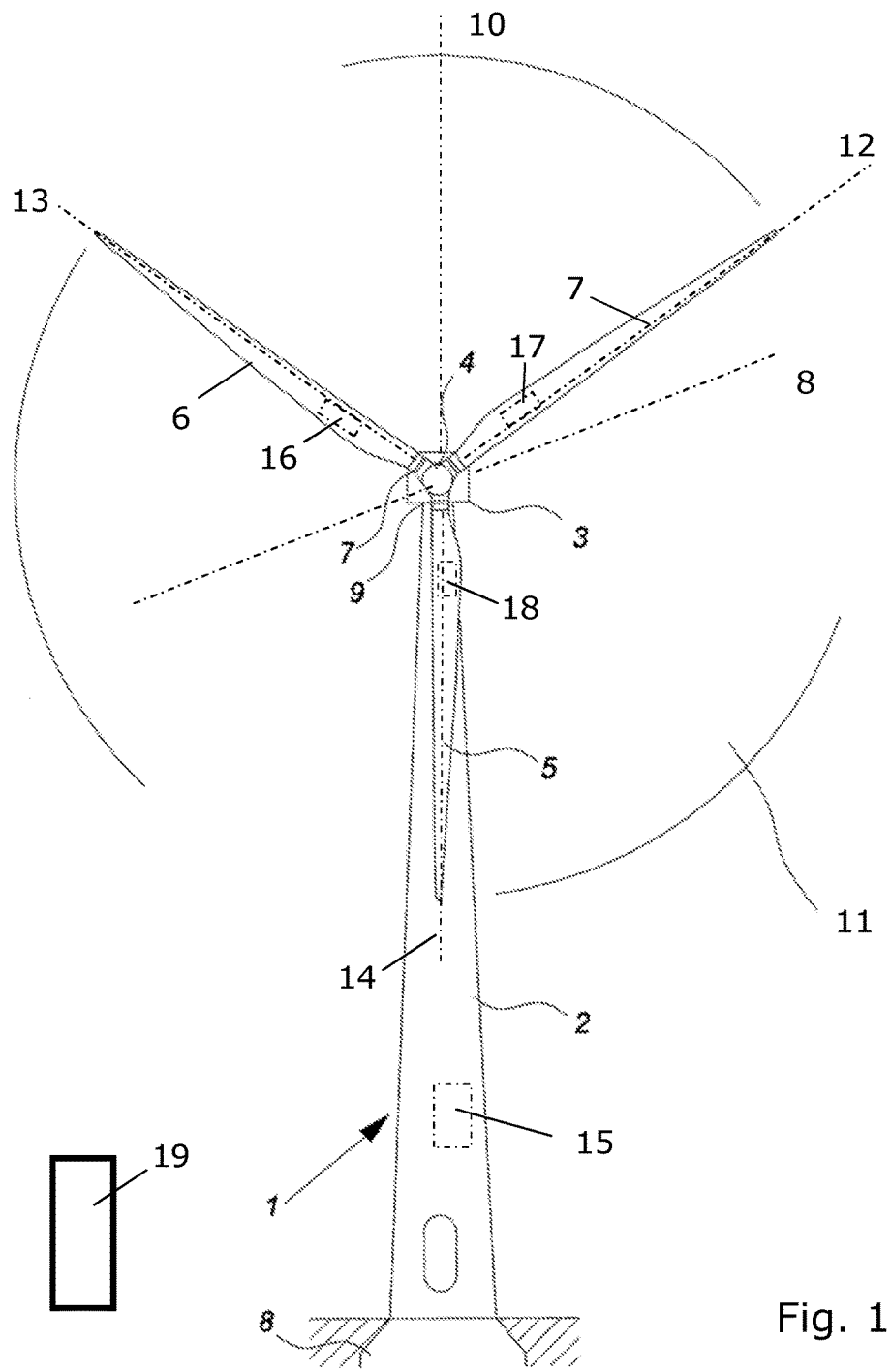
FIG. 1 illustrates a wind turbine.

FIG. 1 illustrates a wind turbine comprising a tower 2, a nacelle 3, a rotor 4 with three rotor blades 5, 6, 7.

The rotor 4 and the blades are rotatable about an azimuth axis visualised by the dotted line 8.

The nacelle 3 is carried on the tower via a yaw system 9 making the nacelle rotatable about the yaw axis which is visualised by the dotted line 10 relative to the tower.

The rotor plane defined by the blades when the rotor rotates is indicated by numeral 11. By use of the yaw system and wind direction sensors, the nacelle can be rotated constantly about the yaw axis 10 whereby the rotor shaft is kept up against the wind and whereby the rotor plane becomes perpendicular to the wind direction.

Each blade is rotatable about a pitch axis 12, 13, 14 extending in the longitudinal direction of the blades.

To understand the asymmetric loading on the rotor plane and to counteract such loads, the asymmetry is typically divided in two which are normally referred to as tilt and yaw. Yaw is the force acting about the yaw axis in a horizontal plane, and tilt is a force acting perpendicularly to the azimuth axis in a vertical plane.

The wind turbine comprises a load control system visualised by the box 15. The load control system is shown inside the tower, but it could be located anywhere—even outside and away from the turbine. The load control system receives load signals from the blade bending sensors 16, 17, 18 located in each blade.

Based on the load signals, the load control system can determine a load distribution over the rotor plane and thereby detect asymmetric loads which cause the mentioned unwanted tilt or yaw.

Tilt is typically caused by wind shear, i.e. by a wind speed which increases from the bottom of the rotor plane towards the top or it may be caused by a wind direction which is not defined in a horizontal plane, e.g. by upwinds.

Yaw can typically be caused by a yaw error which means that the nacelle is not correctly rotated up against the wind. This again can be caused by rapidly changing wind directions where the yaw system is incapable of moving fast enough to bring the rotor shaft up against the wind and thus bring the rotor plane perpendicular to the wind direction.

The pitching is carried out by pitching motors, typically, hydraulic actuators, located in the hub and acting on each blade individually. Since the pitch angle of the blades determines a degree of conversion between the wind energy and the force which acts on the rotor shaft, the individual pitching can be used for controlling a load distribution over the rotor plane.

The load control system can set a blade pitch value for each rotor blade individually to compensate for asymmetry in load on the rotor or rotor plane. In this process, the load control system compares the determined load distribution over the rotor plane with a threshold value. If the determined asymmetry exceeds the threshold value, the load control system will continue to compensate by further individual pitching of blades, and if the determined asymmetry is below the threshold value, the load control system will maintain the individual pitching ratio between the blades.

The wind turbine may comprise a sensor 19 located externally and capable of measuring climate conditions, e.g. a wind speed, an air pressure, a temperature, wind turbulence etc.

According to the invention, the load controller can adjust the threshold value based on a loading of the wind turbine or based on measured climate conditions.

The load controller is typically implemented as software in a computer system. The load controller may operate on one singe wind turbine, or it may operate on a plurality of wind turbines, e.g. wind turbines within a certain territory, identical wind turbines, turbines owned by the same owner, or wind turbines operating with the same climate conditions etc.

Figure 2:
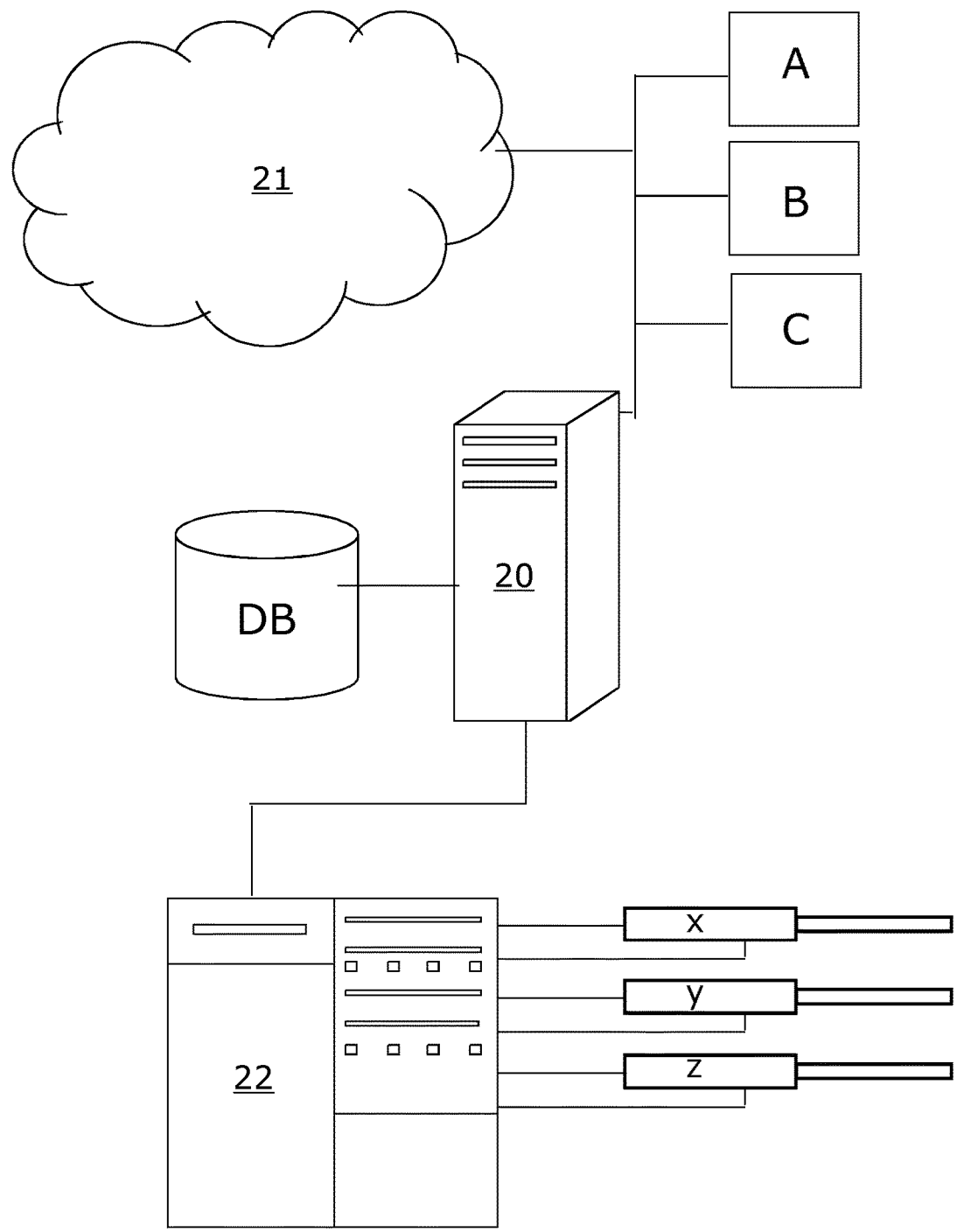
FIG. 2 illustrates diagrammatically details of the load control system.
Figure 3:
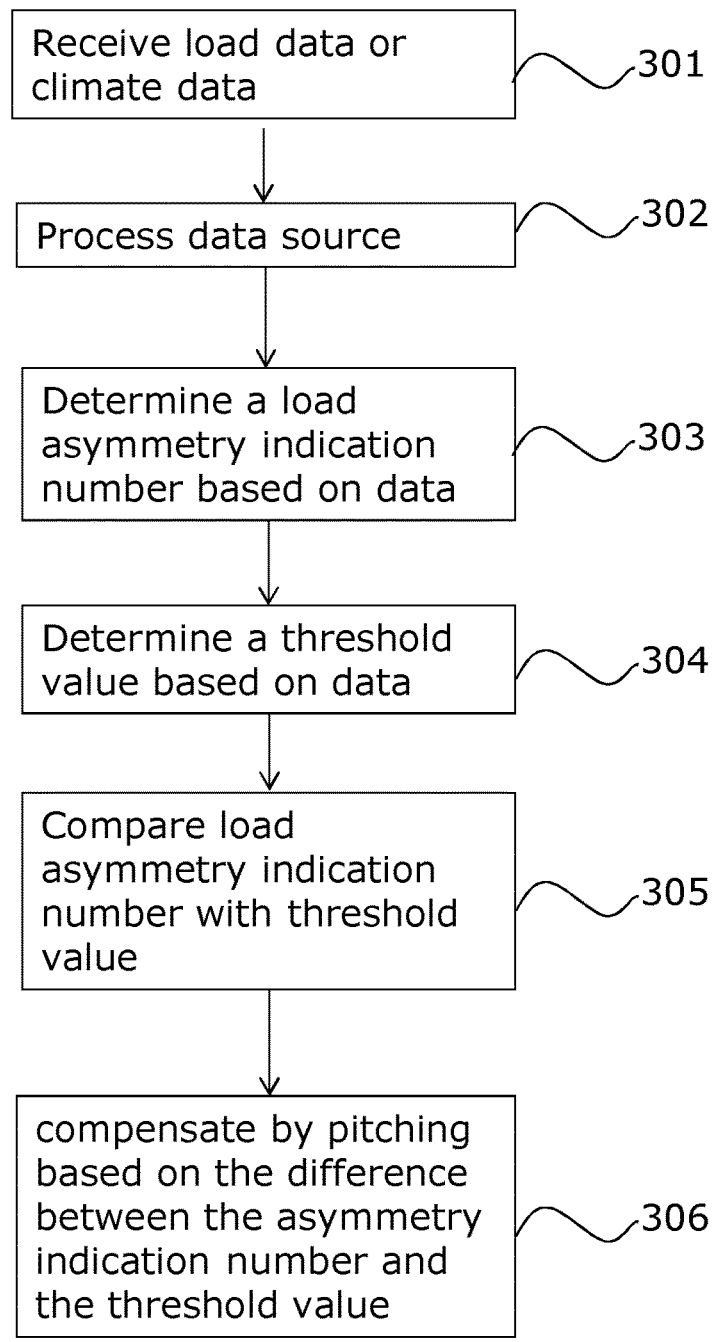
FIG. 3 is a flow-chart illustrating a method according to an embodiment of the invention.

FIGS. 2 and 3 illustrate diagrammatically the main functions of the load control system according to an embodiment. The load controller is implemented in a computer unit 20 which receives load signals and/or signals representing a climate condition from the sensors A, B and C. The sensors could include a torque sensor on the rotor shaft or in the gear box, a blade bending sensor in each blade, an anemometer providing a wind speed etc.

The signals from the sensors A, B and C are fed e.g. by wired or wireless communication into the computer unit 20.

The computer unit 20 is also connected to the cloud 21, which could represent the Internet, an Intranet of a wind turbine owner, a closed computer network of a wind turbine owner or a turbine supplier etc.

The computer unit comprises a data storage marked DB. The data storage comprises a threshold value either in the form of a fixed value or in the form of a mathematical model which can provide a threshold which can be compared with the data from the sensors A, B, C or from the cloud 21. Based on data in the data storage and the sensor data, the computer unit calculates a set of pitch angles alpha, beta, gamma which are communicated to the pitch drive 22. The pitch drive 22 controls the hydraulic cylinders x, y and z which again rotates the blades individually about the pitch axes 12, 13, 14.

FIG. 3 illustrates the main functions of the load control system with regards to deciding whether or not to counteract asymmetric loads.

The system receives load data (step 301) e.g. from blade bending sensors, from yaw motors or from other sensors in the wind turbine. Additionally, or alternatively, the system receives climate data e.g. from sensors or from climate broadcast providers. The data is processed (step 302) and the system determines a load asymmetry indication number (step 303) which indicates a load asymmetry which acts on the rotor plane of the wind turbine.

The system further determines a threshold value based on the received data (step 304). The threshold value is typically indicative of a desired maximum asymmetric loading, or indicative of a limit by which counteracting of the asymmetric loading should be initiated.

The system compares the load asymmetry indication number with the threshold value (step 305) and based on the comparison, the system compensates for the asymmetry by pitching the blades (step 306).

It should be noted that the system may decide not to compensate for asymmetry in step 306. For example, the system may decide not to compensate for asymmetric loadings when the most loaded blade is loaded less than a certain percentage of an average loading, or it may be decided not to compensate when the wind speed or wind turbulence is below a certain level.

The invention claimed is:

1. A wind turbine, comprising:
   a rotor having a plurality of rotor blades, the rotor being rotatable about a rotor axis and defining a rotor plane, each of the plurality of rotor blades being rotatable about a respective pitch axis;
   a load control system, comprising:
      a turbine status sensing system comprising at least one of a turbine loading sensor array, a climate condition sensor array, or a data communications link operable to receive load and climate condition data from a remote data source; and a computer unit operable to:
  determine a load distribution over the rotor plane based on data received from the turbine loading sensor array;
  determine a threshold value based on data received from the turbine status sensing system, wherein determining the threshold value is based on a difference between a measured load on one of the rotor blades and a computed average load for the plurality of rotor blades;
  output, based on a comparison of the determined load distribution and the threshold value, first pitch angle commands for the plurality of rotor blades when an asymmetry of the load distribution is less than the threshold value; and
  output, when the asymmetry of the load distribution exceeds the threshold value, different second pitch angle commands for the plurality of rotor blades that at least partly compensate for the asymmetry; and
a pitch drive system operable to:
  receive pitch angle commands output by the load control system, the pitch angle commands corresponding to one of the first pitch angle commands and the second pitch angle commands; and
  control, using the received pitch angle commands, individual pitch angles for the plurality of rotor blades by actuating each of the plurality of rotor blades about the respective pitch axis.

2. A wind turbine according to claim 1, wherein the load control system is operable to determine the threshold value based on an average wind speed measured over a predetermined time period.

3. A wind turbine according to claim 1, wherein the threshold value is determined such that the compensation for the asymmetry counteracts an asymmetric force on the rotor plane in a vertical plane.

4. A wind turbine according to claim 1, wherein the threshold value is determined such that the compensation for the asymmetry counteracts an asymmetric force on the rotor plane in a horizontal plane.

5. A wind turbine according to claim 1, wherein the threshold value is determined based on a load on a mechanical component that forms part of a drive train between the plurality of rotor blades and a power generator.

6. A wind turbine according to claim 1, where the threshold value is determined based on a tower clearance between a tower of the wind turbine and at least one rotor blade of the plurality of rotor blades.

7. A wind turbine according to claim 1, where at least one of the load distribution, the threshold value, and the compensation for asymmetry is determined by the load control system with a variable update frequency, where the variable update frequency is determined based on a rotational speed of the rotor.

8. A wind turbine according to claim 7, where the load control system is configured to determine a duration for at least one rotor blade to pass the tower of the wind turbine, and to calculate the update frequency based on the duration.

9. A wind turbine according to claim 8, where the variable update frequency is between two and four times a frequency defined as one divided by the duration.

10. A method for controlling a wind turbine comprising a rotor having a plurality of rotor blades, the rotor defining a rotor plane and rotatable about a rotor axis, the wind turbine further comprising a load control system operable to determine a load distribution on the rotor plane and to determine blade pitching values for each individual rotor blade of the plurality of rotor blades, the method comprising:
  determining the load distribution using a measured loading of the wind turbine;
  determining a threshold value corresponding to an asymmetry of the load distribution, wherein determining the threshold value is based on a difference between a measured load on one of the rotor blades and a computed average load for the plurality of rotor blades;
  controlling, based on a comparison of the load distribution and the threshold value, individual pitch angles of the plurality of rotor blades according to first pitch angle commands when the asymmetry is less than the threshold value; and
  controlling the individual pitch angles of the plurality of rotor blades according to different, second pitch angle commands when the asymmetry exceeds the threshold value, wherein the second pitch angle commands at least partly compensate for the asymmetry.

11. A method according to claim 10, where at least one of the load distribution, the threshold value, and the compensation for the asymmetry is determined with an update frequency, wherein the update frequency is determined based on a rotational speed of the rotor.

12. A method according to claim 11, where the update frequency is between 2 and 4 times a frequency defined by a duration for a blade tip to pass a tower of the wind turbine.

13. A computer program product operable to make a computer execute a procedure on one or more computer processors to perform an operation comprising:
  determining a loading of a wind turbine using at least a first received signal, the wind turbine comprising a rotor having a plurality of rotor blades, the rotor defining a rotor plane and rotatable about a rotor axis;
  determining a load distribution over the rotor plane based on the loading of the wind turbine;
  determining a threshold value corresponding to an asymmetry of the load distribution, wherein determining the threshold value is based on a difference between a measured load on one of the rotor blades and a computed average load for the plurality of rotor blades;
  controlling, based on a comparison of the load distribution and the threshold value, individual pitch angles of the plurality of rotor blades according to first pitch angle commands when the asymmetry is less than the threshold value; and
  controlling the individual pitch angles of the plurality of rotor blades according to different, second pitch angle commands when the asymmetry exceeds the threshold value, wherein the second pitch angle commands at least partly compensate for the asymmetry.

14. A load control system for a wind turbine comprising a rotor having a plurality of rotor blades, the rotor defining a rotor plane and rotatable about a rotor axis, the load control system comprising:
  one or more computer processors configured to:
    determine a load distribution using a measured loading of the wind turbine;
    determine a threshold value corresponding to an asymmetry of the load distribution, wherein determining the threshold value is based on a difference between a measured load on one of the rotor blades and a computed average load for the plurality of rotor blades;
    control, based on a comparison of the load distribution and the threshold value, individual pitch angles of the plurality of rotor blades according to first pitch angle commands when the asymmetry is less than the threshold value; and control the individual pitch angles of the plurality of rotor blades according to different, second pitch angle commands when the asymmetry exceeds the threshold value, wherein the second pitch angle commands at least partly compensate for the asymmetry.

* * * * *